United States Patent
Velarde et al.

(10) Patent No.: US 9,453,595 B2
(45) Date of Patent: Sep. 27, 2016

(54) DRAIN MAST SEAL HAVING SEGREGATED CHAMBERS

(71) Applicant: HONEYWELL INTERNATIONAL INC., Morristown, NJ (US)

(72) Inventors: Ernesto Velarde, Glendale, AZ (US); Rob Robbins, Chandler, AZ (US); Gregory John Geyer, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 135 days.

(21) Appl. No.: 14/284,147

(22) Filed: May 21, 2014

(65) Prior Publication Data

US 2015/0337993 A1 Nov. 26, 2015

(51) Int. Cl.
*B64C 1/14* (2006.01)
*B64D 1/00* (2006.01)
*F16L 5/02* (2006.01)
*B64D 41/00* (2006.01)

(52) U.S. Cl.
CPC ............. *F16L 5/02* (2013.01); *B64C 1/1453* (2013.01); *B64D 41/00* (2013.01); *B64D 2041/002* (2013.01)

(58) Field of Classification Search
CPC ........... F16L 5/10; F16L 41/088; F16L 5/08; E03F 5/021; H02G 3/0616; B64C 1/1453; B64D 2041/002
See application file for complete search history.

(56) References Cited

U.S. PATENT DOCUMENTS

| 47,480 | A | * | 4/1865 | Wheeler | F16L 5/10 277/606 |
| 3,552,436 | A | * | 1/1971 | Stewart | F15B 13/00 137/878 |
| 5,176,359 | A | * | 1/1993 | Leveson | F16K 7/17 137/884 |
| 5,442,140 | A | * | 8/1995 | McGrane | F16L 5/10 174/151 |
| 6,435,452 | B1 | | 8/2002 | Jones | |
| 6,578,361 | B1 | * | 6/2003 | Higginbotham | F01D 5/005 60/39.094 |
| 7,731,127 | B2 | | 6/2010 | Hoffjann et al. | |
| 2002/0056789 | A1 | * | 5/2002 | Jones | B64C 1/1453 244/129.1 |
| 2003/0094301 | A1 | * | 5/2003 | Takedomi | F16L 5/10 174/659 |
| 2006/0273224 | A1 | | 12/2006 | Hoffjann et al. | |
| 2007/0143956 | A1 | * | 6/2007 | Kumakura | F16L 5/10 16/2.2 |
| 2008/0136170 | A1 | * | 6/2008 | Liepold | F16L 5/08 285/45 |
| 2011/0127730 | A1 | * | 6/2011 | Seryi | B60H 1/00571 277/606 |
| 2012/0297573 | A1 | * | 11/2012 | Iwahara | F16L 5/10 16/2.2 |
| 2014/0338616 | A1 | * | 11/2014 | Foos | F16L 5/10 123/41.14 |

FOREIGN PATENT DOCUMENTS

FR 2907099 A1 4/2008

OTHER PUBLICATIONS

Extended EP Search Report for EP 15166043.8-1754 dated Oct. 19, 2015.

* cited by examiner

*Primary Examiner* — Kristina Fulton
*Assistant Examiner* — Eugene G Byrd
(74) *Attorney, Agent, or Firm* — Lorenz & Kopf, LLP

(57) ABSTRACT

A single drain mast seal that provides a fluidly segregated internal chamber for air inlet drain lines is provided. The provided drain mast seal does not significantly add to the seal's compressive load and minimizes the seal's three-dimensional space claim. In addition, the provided drain mast seal is formed to sufficiently support associated drain lines without requiring external clamps or hardware components. The provided drain mast seal thereby optimizes the APU-to-drain mast interface.

16 Claims, 4 Drawing Sheets

DRAIN MAST SEAL HAVING SEGREGATED CHAMBERS

TECHNICAL FIELD

Embodiments of the subject matter described herein relate generally to drain seals of the type used with turbomachines and, more particularly, to aircraft auxiliary power unit (APU) drain mast seals.

BACKGROUND

Turbomachines include gas turbine engines, such as auxiliary power units (APU), propulsive gas turbine engines deployed onboard aircraft and other vehicles, turboshaft engines utilized for industrial power generation, and non-gas turbine engine turbomachines, such as turbochargers. Within a turbomachine, various individual components have dedicated functions; examples of the individual components include a fuel pump, hydraulic pump, breather, fuel control unit, combustor housings, oil pump, etc.

During the course of normal operation, some of the turbomachine components may leak or bleed effluent, such as small amounts of fuel, condensation, oil, or the like. A low pressure discharge of air used for controlling seal leakage may also occur. Therefore, normal turbomachine maintenance generally includes inspecting individual components of the turbomachine for leaks and discharge, and assessing, by the presence and quantity of a given leak, whether a problem with the associated component is indicated.

To ease turbomachine maintenance and inspection, drain lines are often attached to relevant components, generally at the gravitationally lowest part of the component. The drain lines may then be routed to a single location, and ganged together on a single drain bracket for convenient access. This drain line grouping is then typically ported out into a dedicated drain cavity called the drain mast. The drain mast allows for passage of drain fluids from an internal aircraft compartment through to the outside of the aircraft skin (fuselage). The aircraft drain mast can be viewed from outside the fuselage to observe telltale signs of effluent, drainage, discharge, or leakage. An external indication of leakage can be followed by an action to access the turbomachine compartment and investigate which APU component may be the source of leakage.

In addition to using drain lines for component leakage, discharge, or effluent, one or more drain lines referred to as an inlet drain lines may respond to negative pressure generated by a turbomachine by drawing air (in-flowing air) into the turbomachine during ground operation of an APU to provide "bleed air" to the environmental control system (ECS) for air conditioning. In these circumstances, the in-flowed air may get mixed with air being fed by the APU plenum that serves as the bleed air source to the ECS for air conditioning.

Even though only small amounts of liquids or fuels are normally released through the effluent drain lines, an undesirable condition occurs when an inlet drain line ingests flammable or odorous fumes from proximate drain lines that have leaked small amounts of fuel, oil, liquids, or particles. This undesirable condition may occur, for example, when the aircraft is not in flight and the APU is running to supply air conditioning, resulting in detectable odors in the cabin of the aircraft. Traditional solutions space the inlet drain lines far from the effluent drains, use multiple seals, or use an additional check valve to isolate an inlet drain line; as such, traditional solutions increase space, weight, and cost, and the associated increase in design complexity impacts the system reliability.

Consequently, a single drain mast seal that provides a fluidly segregated internal chamber for air inlet drain lines is desirable. The desired drain mast seal does not significantly add to the drain mast seal's compressive load and minimizes the drain mast seal's associated three-dimensional space claim, thereby optimizing the APU-to-drain mast interface.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

A drain mast seal is provided. The drain mast seal includes a continuous wall having a first edge and a second edge that substantially opposite the first edge. A ceiling that is substantially perpendicularly coupled to the first edge and forming with the wall first and second chambers is also included. The ceiling has a first opening into the first chamber and a second opening into the second chamber.

A drain mast seal system for coupling a first plate to a second plate is provided. The drain mast seal system has a continuous wall having a first edge and a second edge substantially opposite the first edge. Also included is a ceiling substantially perpendicularly coupled to the first edge and forming with the wall first and second chambers, the ceiling having a first opening into the first chamber and having a second opening into the second chamber. The ceiling is coupled to the first plate such that a first opening of the first plate aligns with the first opening in the drain mast seal and a second opening of the first plate aligns with the second opening in the drain mast seal. The second plate is coupled to the second edge such that the second plate provides a first opening into the first chamber and a second opening into the second chamber.

Another drain mast seal is provided. The drain mast seal includes a continuous wall defining an interior cavity, the wall having a first edge and a second edge that is substantially opposite the first edge. A ceiling is included that is substantially perpendicularly coupled to the first edge. A barrier is coupled to the wall and the ceiling for dividing the cavity into a first chamber and a second chamber. The ceiling has a first opening into the first chamber and has a second, third, and fourth opening into the second chamber.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived by referring to the following Detailed Description and Claims when considered in conjunction with the following figures, wherein like reference numerals refer to similar elements throughout the figures, and wherein:

DETAILED DESCRIPTION

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary or the following Detailed Description.

For the sake of brevity, conventional techniques related to functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

The embodiment described herein is merely an example and serves as a guide for implementing the novel systems and method herein on any user interface in any industrial, commercial, or consumer turbomachine application. As such, the examples presented herein are intended as non-limiting.

Figure 1:
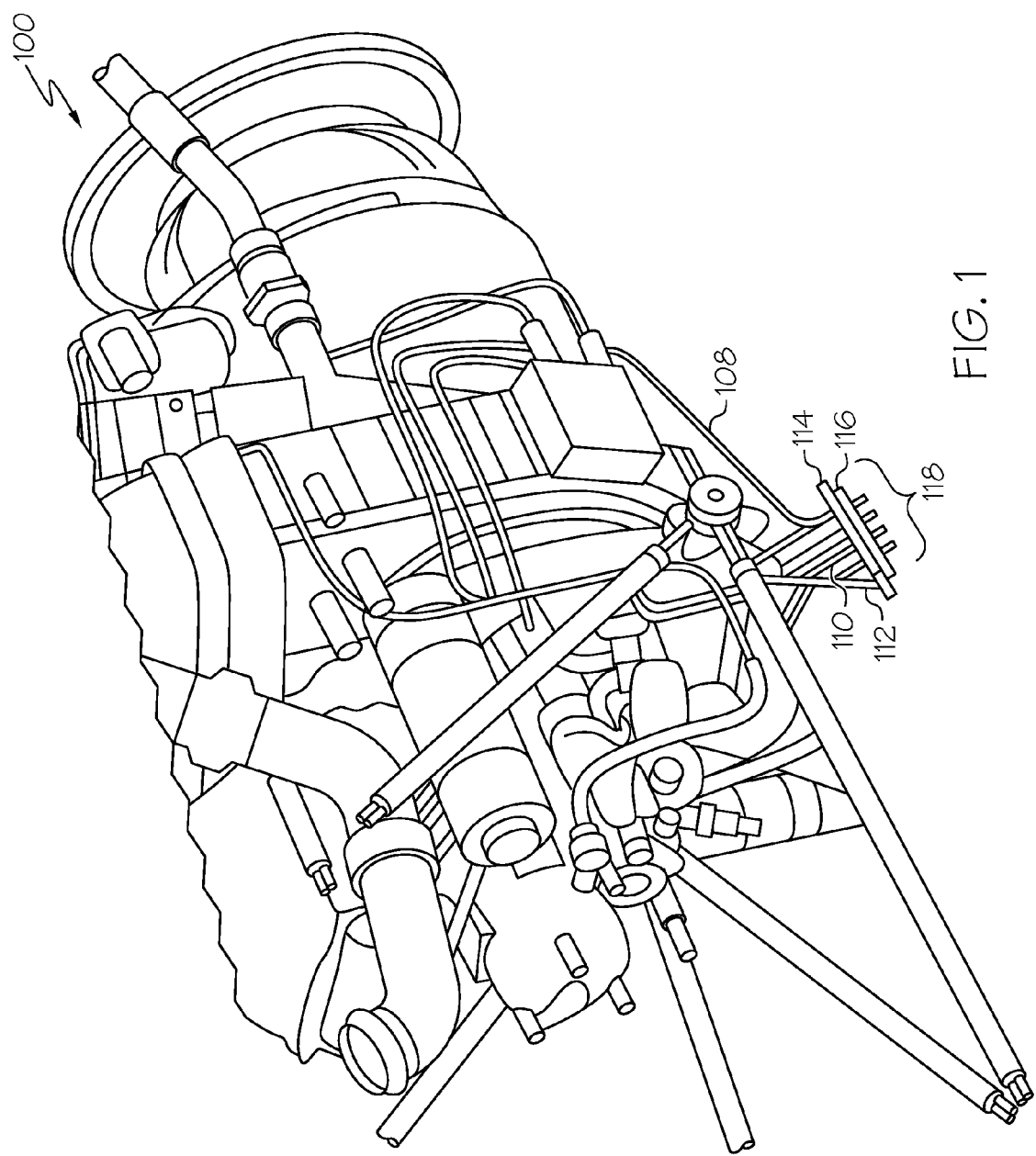
FIG. 1 is an illustration of a generalized turbomachine showing drain lines in a manner suitable for use with an exemplary embodiment.

FIG. 1 is an illustration of a generalized turbomachine 100. Generalized turbomachine 100 shows exemplary drain lines, such as drain line 108, drain line 110 and drain line 112, which originate within the turbomachine and are extended out to an external location. The drain lines are shown ganged together at bracket 114 and passing through a seal 116. In practice, bracket 114 may be secured to a sealing surface such as an external wall or structure (not shown), at which time seal 116 would be compressed between bracket 114 and the sealing surface. At arrow 118, the ganged-together drain lines are shown for easy access and inspection. The embodiment shown as turbomachine 100 is merely exemplary. Other engine and turbomachine embodiments may utilize the technique illustrated in FIG. 1. Furthermore, the number of drain lines and the placement of the ganged-together drain lines may vary from embodiment to embodiment.

Figure 2:
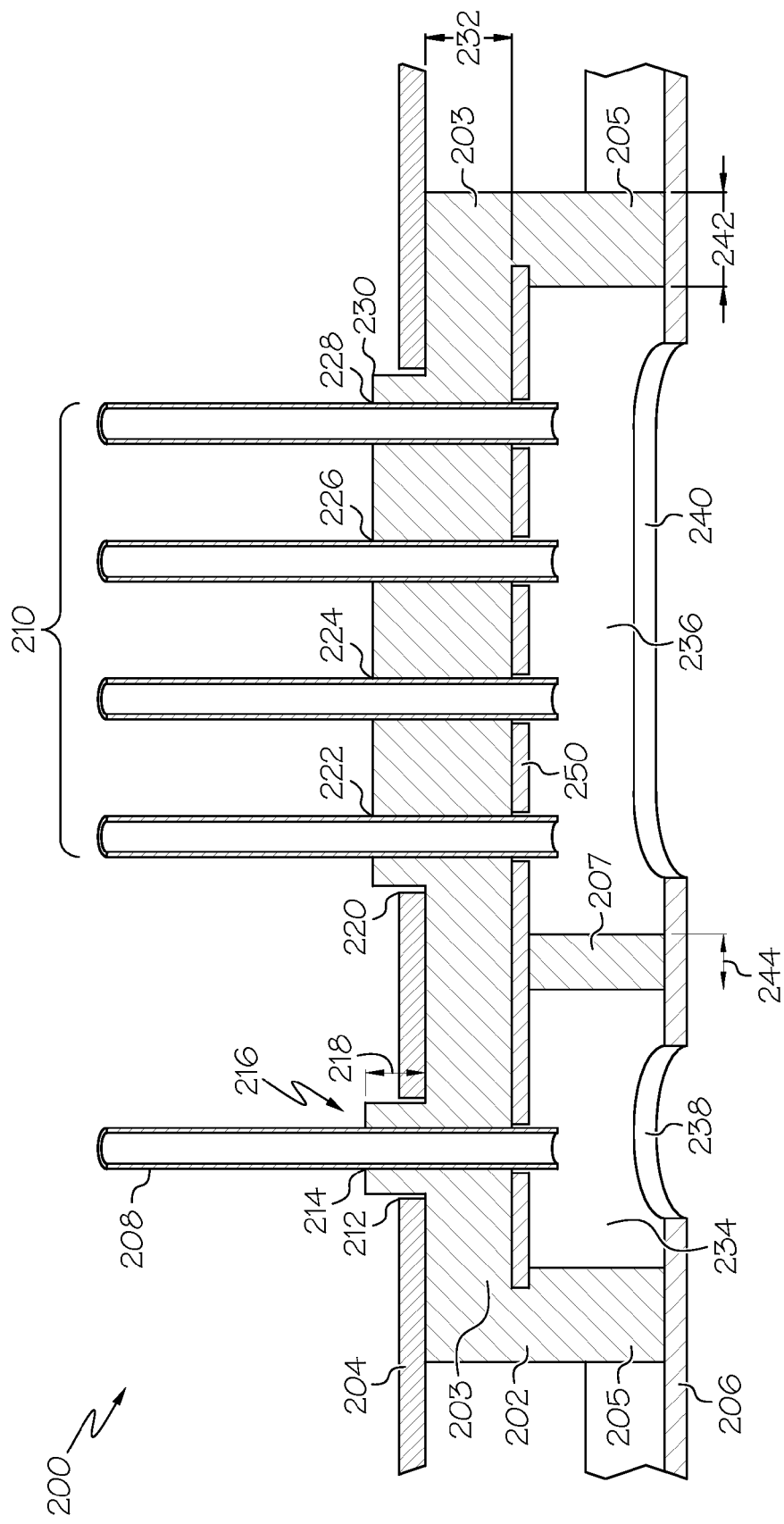
FIG. 2 is a cross section of a drain mast seal having segregated chambers according to an exemplary embodiment.

FIG. 2 is a cross section of a drain mast seal having segregated chambers according to an exemplary embodiment. Drain mast seal 202 is shown coupled between a first plate 204 (which may be an APU structure) and a second plate 206 (which may be part of an aircraft structure). For simplifying purposes, coupling fasteners or apparatus are not shown. Drain mast seal 202 includes a ceiling 203, a continuous wall 205, and a barrier 207. Wall 205 is coupled to ceiling 203 at a first edge, and extends around the perimeter of the ceiling, creating a substantially hollow cavity under the ceiling 203. Barrier 207 divides the cavity into a first chamber 234 and a second chamber 236. A metal plate 250 may be coupled to the ceiling on the chamber side, to distribute load from any coupling fasteners or apparatus used to couple the drain mast seal 202 to a first plate such as the drain mast bracket of the APU. When metal plate 250 is present, it may have a thickness of substantially 0.04 inches and have openings that are coaxial with, and aligned with, associated openings in the ceiling.

A second plate 206 is coupled to the first plate 204 via the drain mast seal 202. Within the drain mast seal 202, it is the second edge of continuous wall 205 that is coupled to the second plate 206. The second plate 206 has two openings: a first opening 238 is aligned with the first chamber 234, and second opening 240 is aligned with the second chamber 236. Drain mast seal 202 has a ceiling thickness 232, a wall thickness 242, and a barrier thickness 244. In the exemplary embodiment of FIG. 2, barrier 207 is coupled to metal plate 250, ceiling 203, and continuous wall 205, and segregates the cavity created by the ceiling 203 and continuous wall 205 into a first chamber 234 and a second chamber 236. The drain mast seal 202 forms a compliant seal when coupled between first plate 204 and second plate 206 and allows for drainage flow from the APU drain system lines into specific or dedicated passages in the aircraft's drain mast.

Figure 3:
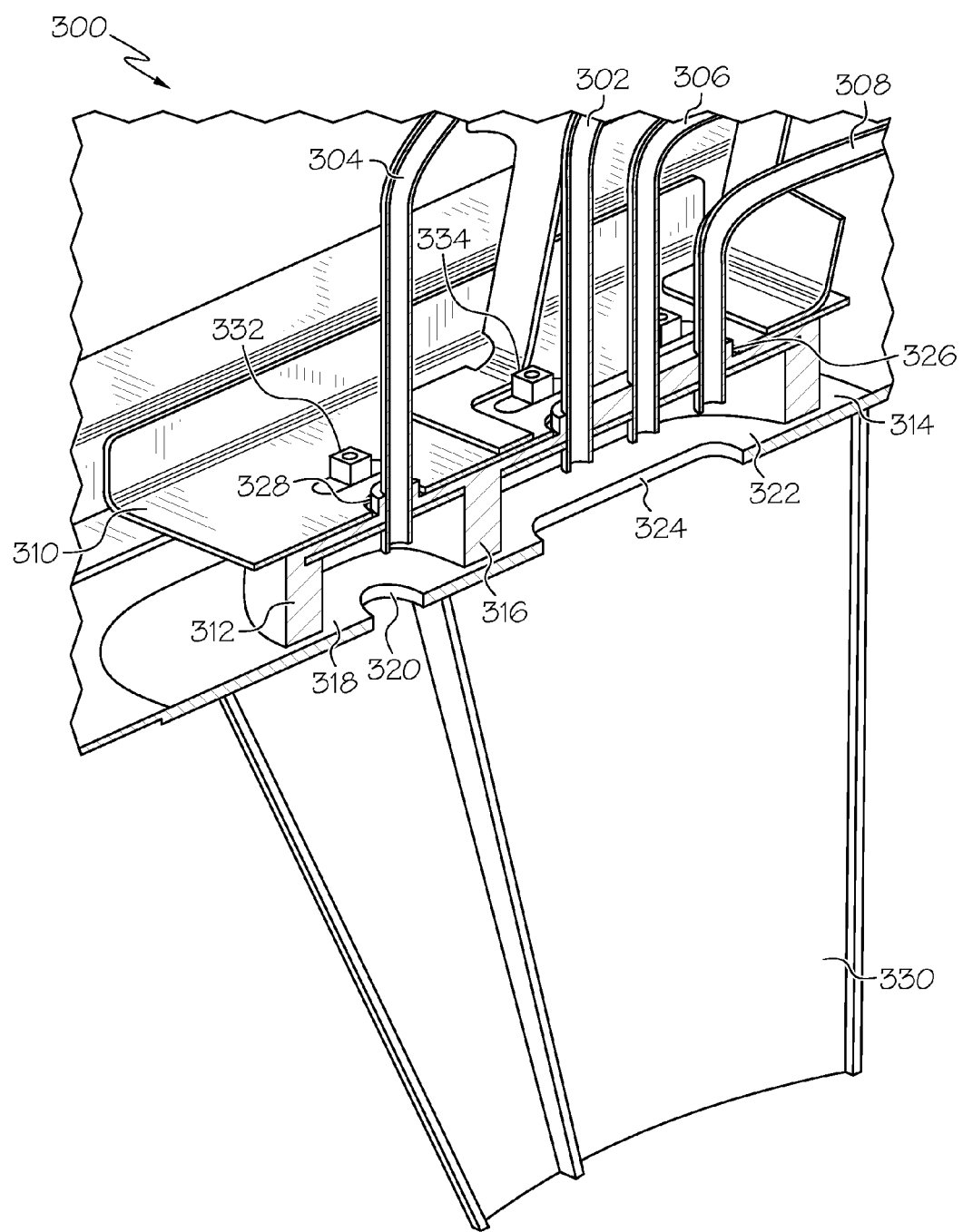
FIG. 3 is an isometric view of an exemplary embodiment of a drain mast seal having segregated chambers for use in an aircraft APU.

As described in more detail in FIG. 3, the first chamber 234 may be for receiving inflow air and the second chamber 236 may be for receiving effluent. Opening 214 is configured to seal around a respective drain line. Although the first chamber may be referred to as an air chamber and the second chamber may be referred to as an effluent chamber, in some embodiments the first chamber may receive drainage or leakage. Also, while effluent is referred to as drainage or leakage of small amounts of fuel, liquid, condensation, oil, or the like, in some embodiments, one or more drain lines may support a flowing or purging of a liquid or substance in the effluent chamber.

The ceiling 203 of drain mast seal 202 forms a first collar 216 around the opening 214 for supporting drain line 208. Drain line 208 is shown extending through opening 212 in the first plate 204 and through opening 214 in drain mast seal 202. A second collar 230 is formed that provides support for each individual drain line in the grouping of drain lines 210, and extends around the grouping of drain lines 210. Opening 214 and openings 222, 224, 226 and 228 are configured to provide sealing around the respective drain lines. Collar 230 extends upward through the shared opening 220. Drain lines 210 are shown extending through a shared opening 220 in the first plate 204 and then through separate openings 222, 224, 226 and 228 in the collar 230 of drain mast seal 202. The collar around drain lines 210 and the collar around drain line 208 may have substantially the same collar height 218. In the exemplary embodiment, collar 216 and collar 230 are configured to support the respective drain lines without requiring external clamps or stabilizing components, bringing an additional reduction to the overall three-dimensional space claim and the weight of the drain mast interface over traditional solutions.

The exemplary embodiment shows drain line 208 terminating within the first chamber 234 and drain lines 210 terminating within the second chamber 236. A second plate, 206, is shown coupled to the wall 205 at a second edge of the wall. Barrier 207 is coupled to the second plate 206, between opening 238 and opening 240. Other embodiments may include additional chambers in accordance with additional criteria for segregating the chambers. Each chamber may accommodate a plurality of drain lines.

FIG. 3 is an isometric view of an exemplary embodiment of a drain mast seal having segregated chambers for use in an aircraft APU. Drain mast seal 312 is shown coupled between a first plate 310 and a second plate 314. In this embodiment, the first plate is the APU drain mast bracket and the second plate is an aircraft drain mast sealing surface. Coupling fasteners 332 and 334 are shown coupling the first plate 310 to the drain mast seal 312.

Inlet plenum drain line 304 is shown extending from the APU, through a collar 328 and into the air, or first chamber 318. Drain line 302, drain line 306, and drain line 308 are shown extending through a collar 326 and into the effluent, or second chamber 322. In the exemplary embodiment, drain line 302 may be an aircraft Line Replacement Unit (LRU) drain line, drain line 306 may be a Load Compressor (L/C) Face seal drain line, and drain line 308 may be a combustor/educator drain line.

The second plate 314 includes an opening 320 into the first chamber 318 and an opening 324 into the second chamber 322. Barrier 316 is shown segregating the first chamber 318 from the second chamber 322. In the exemplary embodiment, opening 320 and opening 324 lead into a drain mast 330.

Figure 4:
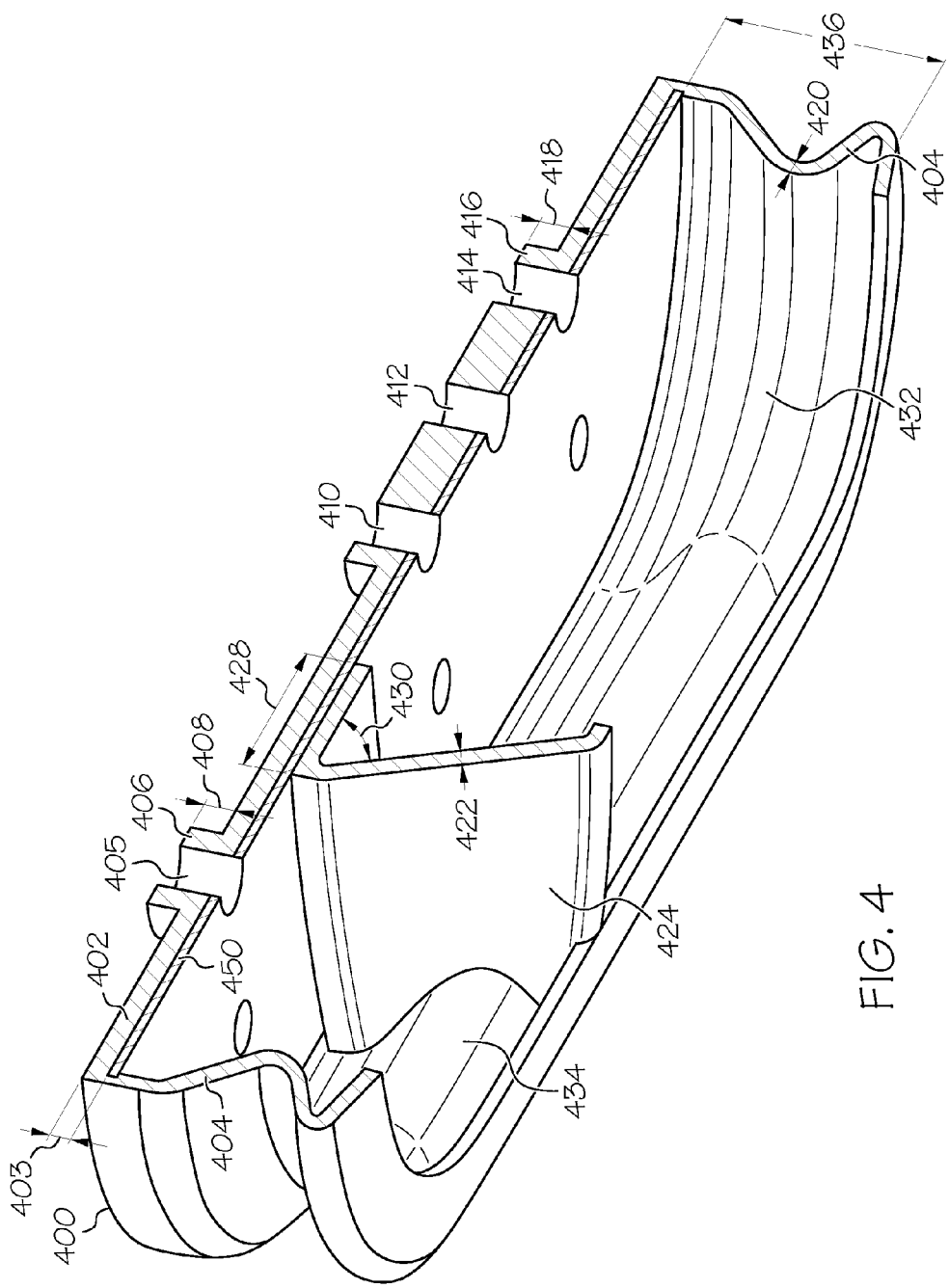
FIG. 4 is an isometric view of a drain mast seal according to an exemplary embodiment.

FIG. 4 is an isometric view of a drain mast seal 400 according to an exemplary embodiment. As previously described, drain mast seal 400 includes ceiling 402 coupled to continuous wall 404 and coupled to barrier 424, forming a first chamber 434 and a second chamber 432. A metal plate 450 may be coupled to the ceiling on the chamber side to distribute any load from any coupling fasteners or apparatus when the seal is coupled to the drain mast bracket of the APU. When metal plate 450 is present, it may have a thickness of substantially 0.04 inches and have openings that are coaxial with, and aligned with, associated openings in the ceiling.

In the exemplary embodiment, the ceiling 402 has thickness 403 and continuous wall 404 has a thickness 420. The ceiling and wall thickness must be designed to meet various environmental, sealing, and attachment requirements, such as those set forth in, "Environmental Conditions and Test Procedure for Airborne equipment" (RTCA DO-160), and "Powerplant Installation and Propulsion System Component Fire Protection Test Methods, Standards and Criteria" (FAA Advisory Circular 20-135), as well as any regulatory requirements promulgated by the Federal Aviation Administration, and any specific customer requirements. Barrier 424 has thickness 422 that is selected as determined by the application, and generally ranges from about 0.03 inches to about 0.50 inches. The barrier 424 material and thickness are not subject to the environmental, sealing, and attachment requirements that apply to the continuous wall 404 and ceiling 402.

Extending above the ceiling, the drain mast seal includes a collar surrounding opening 405 into the first chamber 434 having a height 408 designed and configured to provide adequate support for a drain tube. A collar 416, having a height 418 designed and configured to provide adequate support for associated drain tubes, also surrounds opening 410, opening 412, and opening 414. Each opening 410, 412 and 414 lead into the second chamber 432. As previously described, the collar feature is substantial enough to support the associated drain lines coming into the drain mast seal without relying on external clamps or stabilizing hardware.

In the exemplary embodiment, barrier 424 is a continuous piece of material having a tab that is substantially parallel to the ceiling 402 and coupled thereto for a length 428 ranging from about 0.125 inches to about 2.5 inches. Barrier 424 extends downward from ceiling 402, at an angle 430 from the tab. The angle 430, which may range from five degrees to ninety degrees, allows the barrier to deflect without significantly increasing the compressive load of the seal. Barrier 424 and wall 404 extend from ceiling 402 to a distance 436 ranging from about 0.5 inches to about four inches from ceiling 402. In the exemplary embodiment, wall 404 and barrier 424 include some curvature. As shown, barrier 424 is coupled to the wall 404 and metal plate 450, creating the chambers 434 and 432; however, barrier 424 may be coupled to a fastener load plate (for example 310 of FIG. 3) comprised of any material or to ceiling material 402 that may cover the metal plate 450. Barrier 424 is sufficient to prevent fluid or particles from the second, or effluent, chamber to cross into the first, or air, chamber when air is inflowing into the inlet drain in the first chamber.

The entire drain mast seal in the exemplary embodiment may be made of an elastomer with reinforcement of metallic and/or non-metallic material, but other embodiments may successfully utilize other materials and combinations of materials such as mica, Nextel™, fiberglass or carbon composites.

Thus, there has been provided a drain mast seal and drain mast seal system that provides fluidly segregated internal chambers, allowing for continued segregated fluid passage to a drain mast. The described drain seal does not significantly add to the drain seal's compressive load and minimizes the seal's associated space claim, thereby optimizing the APU-to-drain mast interface.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A drain mast seal comprising:
   a continuous wall having a first edge and a second edge that is substantially opposite the first edge;
   a ceiling substantially perpendicularly coupled to the first edge, forming a substantially hollow cavity within the continuous wall;
   a barrier extending across the cavity, coupled to the wall and the ceiling and dividing the cavity into a first chamber and a second chamber, wherein the barrier is formed of a continuous piece of material with curvature, the barrier defined by (i) a tab that is substantially parallel to the ceiling and coupled thereto for a predetermined length, (ii) a portion extending downward from the tab, (ii) and curvature defined by a predetermined angle between the tab and the portion that extends downward;

and wherein the ceiling has a first opening into the first chamber and has a second opening into the second chamber.

2. The drain mast seal of claim 1, wherein the first opening is configured to receive and seal around a first drain line and the second opening is configured to receive and seal around a second drain line.

3. The drain mast seal of claim 2, further comprising:
a first collar located circumferentially around the first opening and extending externally from the first chamber; and
a second collar located circumferentially around the second opening and extending externally from the second chamber.

4. The drain mast seal of claim 1, wherein the barrier is sufficient to prevent fluid or particles from the second chamber to cross into the first chamber, has a thickness that ranges from about 0.03 inches to about 0.50 inches, and has a predetermined angle less than ninety degrees and more than five degrees.

5. The drain mast seal of claim 1, wherein the predetermined length ranges from about 0.125 inches to about 2.5 inches.

6. The drain mast seal of claim 1, wherein the continuous wall has a thickness that ranges from about 0.03 inches to about 0.50 inches.

7. The drain mast seal of claim 6, wherein the continuous wall thickness and a ceiling thickness adhere to standards generated and published by the Federal Aviation Administration (FAA) and Radio Technical Commission for Aeronautics (RTCA).

8. The drain mast seal of claim 3, wherein the first collar is configured to support the first drain line.

9. The drain mast seal of claim 3, wherein the second collar is configured to support the second drain line.

10. The drain mast seal of claim 1, wherein the drain mast seal is comprised of an elastomer with reinforcement of metallic material.

11. The drain mast seal of claim 1, wherein the drain mast seal is comprised of an elastomer with reinforcement of non-metallic material.

12. A drain mast seal comprising:
a continuous wall defining an interior cavity, the wall having a first edge and a second edge that substantially opposite the first edge;
a substantially planar ceiling extending across the interior cavity, substantially perpendicularly coupled to the first edge;
a barrier extending across the cavity, coupled to the wall and the ceiling, the barrier dividing the cavity into a first chamber and a second chamber, wherein the barrier is formed of a continuous piece of material with curvature, the barrier defined by (i) a tab that is substantially parallel to the ceiling and coupled thereto for a predetermined length, (ii) a portion extending downward from the tab, (ii) and curvature defined by a predetermined angle between the tab and the portion that extends downward;
and
wherein the ceiling has a first opening into the first chamber and a second, third, and fourth opening into the second chamber.

13. The drain mast seal of claim 12, wherein the first opening configured to receive and seal around a first drain line and the second, third, and fourth openings are configured to receive and seal around a second, third, and fourth drain line, respectively.

14. The drain mast seal of claim 12, wherein the predetermined length ranges from about 0.125 inches to about 2.5 inches.

15. The drain mast seal of Claim 12, wherein the predetermined angle more than five degrees and less than ninety degrees.

16. The drain mast seal of claim 15, further comprising:
a first collar located circumferentially around the first opening and extending externally from the first chamber; and
a second collar located circumferentially around the second, third, and fourth opening and extending externally from the second chamber.

* * * * *